Dec. 5, 1939.　　　H. E. DRENNAN　　　2,181,877
PROCESS OF TREATING HYDROCARBON OILS
Filed May 19, 1936
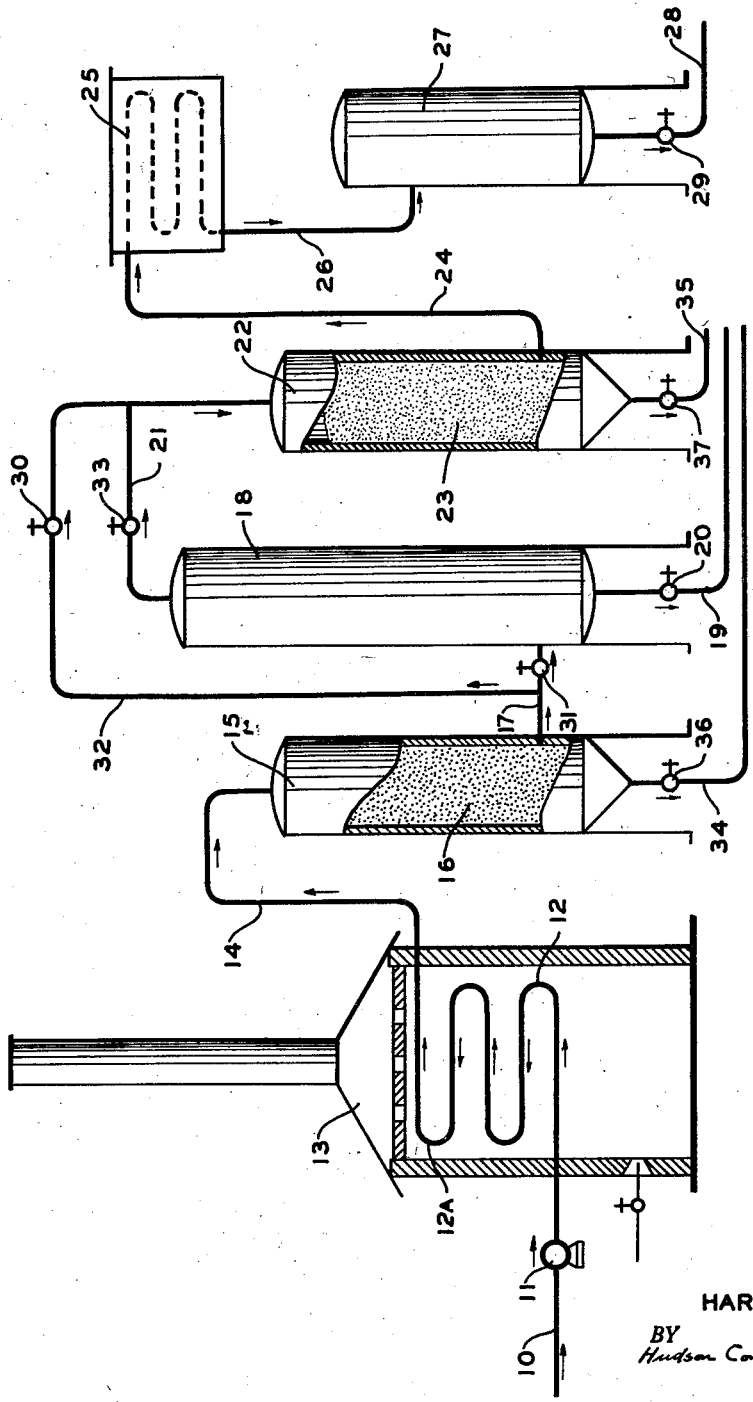
INVENTOR.
HARRY E. DRENNAN
BY
ATTORNEYS.

Patented Dec. 5, 1939

2,181,877

UNITED STATES PATENT OFFICE 2,181,877

PROCESS OF TREATING HYDROCARBON OILS

Harry E. Drennan, Whittenburg, Tex., assignor to Phillips Petroleum Company, a corporation of Delaware Application May 19, 1936, Serial No. 80,627

3 Claims. (Cl. 196—52)

This invention relates to the art of treating hydrocarbons for the purpose of producing therefrom an improved type of motor fuel. In its more specific aspects, the present invention relates to the treatment of hydrocarbons of the gasoline type to convert the same into gasoline like products having high anti-knock qualities.

The object of this invention, therefore, is to treat hydrocarbons of the gasoline type to improve their qualities.

A still further object of this invention is to treat hydrocarbons of the gasoline type by contacting the same with Brucite and thereby improve the anti-knock qualities of the same.

Briefly, by this invention it is proposed to produce gasoline like products of high quality by passing hydrocarbon oils in vapor phase, while maintained in a highly heated or superheated form, into contact with Brucite which is maintained by the heat of the vapors or otherwise at a temperature above the normal vapor temperature at the existing pressure of the hydrocarbons under treatment.

The following description, which is a preferred type of operation, is offered merely for purpose of disclosing the different stages to include the various temperatures and conditions which exist and is not to be considered as limitations thereto, as the method is capable of many variations which are included within the general scope of the invention.

The figure of the drawing illustrates diagrammatically one type of apparatus for effecting the present invention.

The hydrocarbon oil to be treated is introduced through pipe 10 by means of a pump 11 and forced into a heating coil 12 contained in the furnace 13 which may be heated by any suitable means. In coil 12 the oil is vaporized and heated to any desirable temperature, and the heated vapors pass from coil 12 to a continuation thereof 12A wherein the vaporized oil is superheated and from whence it passes through the pipe 14 into a catalytic treatment tower 15 in which there is contained a body of Brucite, designated by the reference numeral 16. The vapors entering the tower 15 pass through the body 16 of Brucite which is maintained by the heat of the vapors, or by any other suitable means, at a desired temperature. The treated vapors leave the tower 15 near the bottom thereof and flow through a pipe 17 controlled by valve 31, into a fractionating tower 18 where the product is cut to the desired end point, whether it be gasoline or tractor fuel, and which may be withdrawn through pipe 19 controlled by valve 20.

The vapors pass overhead from the fractionating tower 18 through the conduit 21 and into a second tower 22 containing a body 23 of clay through which the vapors pass. Vapors leave the clay containing tower 22 through conduit 24 and pass through a condenser 25 and then flow through conduit 26 to a tank 27 from which they are withdrawn through pipe 28, controlled by valve 29, to storage.

If the product being charged to the vaporizing coil 12 is in the boiling range desired, fractionating tower 18 may be by-passed and the vapors passed directly from the catalyst tower 15 to the clay tower 22 at the desired temperature. Wherein it is desired to by-pass the vapors around the fractionating tower 18, the valve 30 in the line 32 is opened, and valve 31 of line 17 and valve 33 of line 21 is closed.

Condensates accumulating in the towers 15 and 22 may be withdrawn from the bottoms thereof through the pipes 34 and 35 respectively, which are controlled by the valves 36 and 37.

The invention contemplates fractionating or refractionation of the hydrocarbon oils treated by the process when required. Examples are given below to clarify the process but are not to be interpreted as limitations to the invention.

*Example 1.*—Cracked gasoline was vaporized and the vapors heated to 700° F. and passed through a tower containing Brucite screened to 10–30 mesh. The tower was maintained at about 700° F. The rate of passing the gasoline vapors through the Brucite was equivalent to 6 bbls. of distillate per hour per ton of Brucite. Tests on the charge and make were as follows:

|  | Charge | Make |
|---|---|---|
| Gravity, A. P. I. | 56.3 | 53.5 |
| Initial boiling point | 83 | 102 |
| 5% °F | 133 | 144 |
| 10% °F | 155 | 164 |
| 20% °F | 194 | 198 |
| 30% °F | 225 | 224 |
| 40% °F | 250 | 248 |
| 50% °F | 279 | 278 |
| 60% °F | 303 | 304 |
| 70% °F | 323 | 334 |
| 80% °F | 358 | 364 |
| 90% °F | 383 | 398 |
| End point °F | 408 | 448 |
| Percent residue | 1 | 1 |
| Percent recovery | 97 | 96 |
| Percent over at 212° F | 24.5 | 26 |
| Percent loss | 1.5 | 3.0 |
| Percent sulfur | 0.104 | 0.099 |
| Octane No | 58.9 |  |
| Tetra ethyl lead to 70 octane No., cc. per gallon | 2.3 | .7 |

The make was sweet to doctor test and free from hydrogen sulphide.

*Example 2.*—Cracked gasoline was vaporized and the vapors heated to 723° F. and passed through a tower containing Brucite screened to 10–30 mesh. The tower was maintained at about 750° F. The rate of passing the gasoline vapors through the Brucite was equivalent to 6 bbls. of distillate per hour per ton of Brucite. Tests on the charge and make were as follows:

|  | Charge | Make |
|---|---|---|
| Gravity, A. P. I. | 56.3 | 54.0 |
| Initial boiling point | 83 | 110 |
| 5% °F | 133 | 148 |
| 10% °F | 155 | 168 |
| 20% °F | 194 | 196 |
| 30% °F | 225 | 224 |
| 40% °F | 250 | 250 |
| 50% °F | 279 | 274 |
| 60% °F | 303 | 300 |
| 70% °F | 323 | 326 |
| 80% °F | 358 | 354 |
| 90% °F | 383 | 390 |
| End point °F | 408 | 448 |
| Percent loss | 1.5 | 2.0 |
| Percent recovery | 97 | 97 |
| Percent over at 212° F | 24.5 | 25 |
| Percent residue | 1 | 1 |
| Percent sulfur | 0.104 | 0.087 |
| Octane No | 58.9 | 61.8 |
| Tetra ethyl lead to 70 octane No., cc. per gallon | 2.3 | .5 |

In practicing this invention the temperature may range from 500° to 1500° F. and the pressure may vary from atmospheric to 5,000 pounds. But when treating lighter hydrocarbons, such as butane and methane, in accordance with this invention the pressure may vary from atmospheric to 5,000 pounds and the temperature from 800° to 1,500° F.

In the practice of this invention it is to be understood that nothing herein stated relative to the description thereof is intended to restrict the type of hydrocarbons of the motor fuel or gasoline range or type that may be treated in accordance with the teachings of this present invention, and accordingly hydrocarbons of the gasoline type or within the gasoline or motor fuel range, derived from distillation, cracking, polymerization, or by any other manner and from any source, may be treated by the method herein described.

I claim:

1. A process for improving the anti-knock characteristics of hydrocarbons boiling within the gasoline range, which comprises passing said hydrocarbons in the absence of added hydrogen into contact with a catalyst consisting of Brucite at a temperature within the range 500 to 1200° F., at a pressure of atmospheric or higher, and at a flow rate sufficient that only a minimum of cracking occurs, thereby obtaining gasoline boiling hydrocarbons of improved anti-knock characteristics.

2. A process of treating hydrocarbons, which comprises passing hydrocarbons boiling substantially within the gasoline range and in the absence of added hydrogen over a body of Brucite while at a temperature within the range of 500° to 1200° F., at a pressure of atmospheric or higher, and at a flow rate so regulated that the product obtained also boils substantially within the gasoline range, thereby improving the anti-knock characteristics of said gasoline.

3. A process for improving the anti-knock characteristics of hydrocarbon motor fuels boiling within the gasoline range, which comprises vaporizing said fuels, superheating said vapors to a temperature within the range 500° to 1200° F., passing said hydrocarbons while at a temperature within said range into contact with a body of Brucite, at a pressure of atmospheric or higher and at a flow rate sufficient that substantially only a minimum of cracking occurs.

HARRY E. DRENNAN.